(12) United States Patent
Im et al.

(10) Patent No.: US 9,983,428 B2
(45) Date of Patent: May 29, 2018

(54) DISPLAY DEVICE INCLUDING CURVE CONTROL ASSEMBLY AND DISPLAY PANEL CURVABLE THEREBY

(71) Applicant: Samsung Display Co., Ltd., Yongin-Si, Gyeonggi-Do (KR)

(72) Inventors: Dong-sung Im, Asan-si (KR); Jeongjin Park, Hwaseong-si (KR); Je-yun Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 15/493,253

(22) Filed: Apr. 21, 2017

(65) Prior Publication Data
US 2017/0315401 A1    Nov. 2, 2017

(30) Foreign Application Priority Data

May 2, 2016 (KR) .................... 10-2016-0054183

(51) Int. Cl.
*G02F 1/1333* (2006.01)
*G09F 13/04* (2006.01)

(52) U.S. Cl.
CPC .... *G02F 1/133308* (2013.01); *G09F 13/0413* (2013.01); *G02F 2001/133314* (2013.01); *G09F 2013/0481* (2013.01)

(58) Field of Classification Search
CPC ......... G02F 1/133305; G02F 1/133308; G02F 2001/133314; G02F 2001/133317; G02F 2001/13332; G02F 2001/133322; G02F 1/133603; G09F 2013/0481; G09F 9/301; G09G 3/342; H04N 5/64; G02B 26/00; G02B 27/01; G06F 1/1652
See application file for complete search history.

(56) References Cited

U.S. PATENT DOCUMENTS

| | | | |
|---|---|---|---|
| 9,081,540 B1 * | 7/2015 | Cho | G06F 1/1601 |
| 9,123,290 B1 * | 9/2015 | Cho | G06F 1/1652 |
| 2014/0247566 A1 * | 9/2014 | Lee | H05K 5/03 |
| | | | 361/749 |

(Continued)

FOREIGN PATENT DOCUMENTS

| | | | | |
|---|---|---|---|---|
| CN | 105206181 A | * | 12/2015 | G09F 9/00 |
| CN | 104537950 B | * | 1/2017 | G06F 1/1601 |

(Continued)

*Primary Examiner* — Hargobind S Sawhney
(74) *Attorney, Agent, or Firm* — Cantor Colburn LLP

(57) ABSTRACT

A display device includes a display panel, a backlight assembly, a back cover and a curve control assembly. The back cover has a curved shape and faces the display panel with the backlight assembly therebetween to cover a back surface of the backlight assembly. The curve control assembly is between the backlight assembly and the back cover to adjust a curved degree of the display panel. The curve control assembly includes a first rail, a second rail, and a rolling unit. The first rail is coupled to the back surface of the backlight assembly, and the second rail is coupled to the back cover to face the first rail. The rolling unit is commonly connected to each of the first rail and the second rail and is movable along the first and second rails to move the display panel in directions toward and away from the back cover.

19 Claims, 9 Drawing Sheets

(56) References Cited

U.S. PATENT DOCUMENTS

| | | | | |
|---|---|---|---|---|
| 2015/0257289 A1* | 9/2015 | Lee | .................... | H05K 5/0017 |
| | | | | 361/749 |
| 2015/0296641 A1* | 10/2015 | Song | .................... | H05K 5/0217 |
| | | | | 361/679.01 |
| 2016/0148554 A1* | 5/2016 | Lim | .................... | G09G 3/20 |
| | | | | 345/694 |
| 2016/0156871 A1* | 6/2016 | Liu | .................... | G06F 1/1601 |
| | | | | 348/836 |
| 2016/0192519 A1* | 6/2016 | Song | .................... | H05K 5/0217 |
| | | | | 361/679.01 |
| 2016/0218316 A1* | 7/2016 | Lee | .................... | H05K 5/03 |
| 2016/0249475 A1* | 8/2016 | Park | .................... | G02F 1/133305 |
| 2017/0238429 A1* | 8/2017 | Zeng | .................... | H05K 5/0017 |
| | | | | 361/807 |

FOREIGN PATENT DOCUMENTS

| | | | | | |
|---|---|---|---|---|---|
| CN | 206040129 | | * | 3/2017 | |
| EP | 2592614 | A1 | * | 5/2013 | ............. F16M 11/08 |
| EP | 2940552 | A1 | * | 11/2015 | ........... G06F 1/1652 |
| JP | 5947366 | B2 | * | 7/2016 | ........... G06F 1/1652 |
| KR | 1020130070423 | A | | 6/2013 | |
| KR | 20140091867 | A | * | 7/2014 | ........... H05K 5/0226 |
| KR | 1020140091867 | A | | 7/2014 | |
| KR | 1020140114201 | A | | 9/2014 | |
| KR | 1020150109046 | A | | 10/2015 | |
| KR | 1020150111145 | A | | 10/2015 | |

* cited by examiner

DISPLAY DEVICE INCLUDING CURVE CONTROL ASSEMBLY AND DISPLAY PANEL CURVABLE THEREBY

This application claims priority to Korean Patent Application No. 10-2016-0054183, filed on May 2, 2016, and all the benefits accruing therefrom under 35 U.S.C. § 119, the contents of which in their entirety are herein incorporated by reference.

BACKGROUND

(1) Field

Embodiments of the present disclosure relate to a display device and, more particularly, to a display device including a curved display panel having a changeable curvature thereof.

(2) Description of the Related Art

Flat display devices are used to display an image in various information processing systems such as a television, a monitor, a notebook and a portable phone. Display devices having curved shapes have been developed. These display devices may provide curved-shaped display surfaces to provide an image with improved stereoscopic effect, immersion and presence to users of curved-shape display devices.

SUMMARY

One or more embodiment of the present disclosure provides a display device in which a curvature of a curved display panel thereof can be relatively easily changed.

An embodiment of the present disclosure provides a display device including a display panel which generates and displays an image with light, a backlight assembly which is coupled to the display panel and provides the light to the display panel, a back cover and a curve control assembly. The back cover has a curved shape, and the back cover faces the display panel with the backlight assembly interposed therebetween to cover a back surface of the backlight assembly. The curve control assembly is disposed between the backlight assembly and the back cover to adjust a curved degree of the display panel.

The curve control assembly includes a first rail, a second rail and a rolling unit. The first rail is coupled to the back surface of the backlight assembly, and the second rail is coupled to the back cover to face the first rail. The rolling unit is disposed between the back cover and the backlight assembly and is commonly connected to each of the first rail and the second rail. The rolling unit is movable along the first rail and the second rail to move the display panel in directions toward and away from the back cover.

BRIEF DESCRIPTION OF THE DRAWINGS

The present disclosure will become more apparent in view of the attached drawings and accompanying detailed description.

DETAILED DESCRIPTION

Figure 1A:
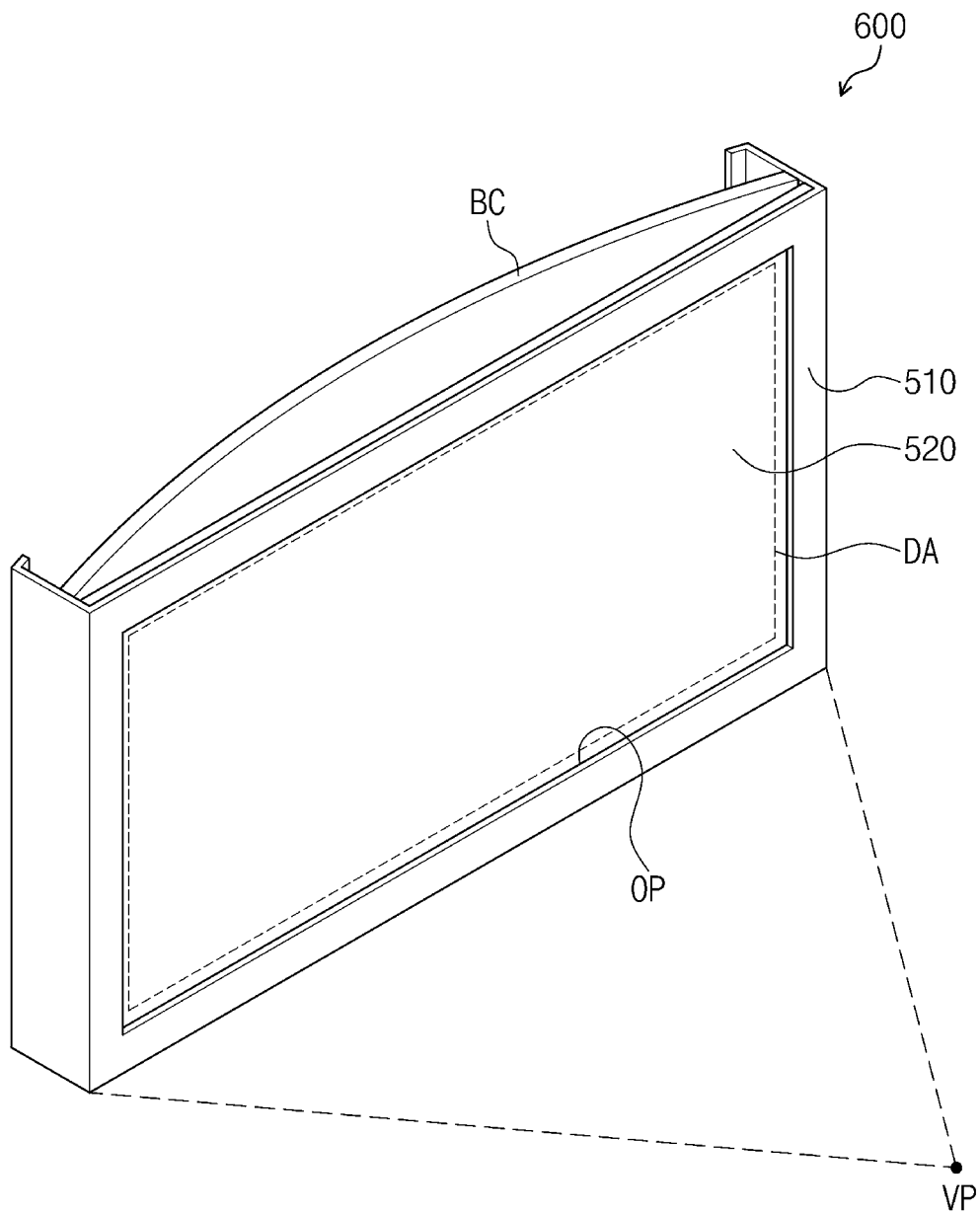
FIG. 1A is a perspective view illustrating an embodiment of a display device including a display panel in a flat state thereof according to the invention.

The present disclosure will now be described more fully hereinafter with reference to the accompanying drawings. The advantages and features of the present disclosure and methods of achieving them will be apparent from the following exemplary embodiments that will be described in more detail with reference to the accompanying drawings. It should be noted, however, that the present disclosure are not limited to the following exemplary embodiments, and may be implemented in various forms. Rather, these embodiments are provided so that this disclosure will be thorough and complete, and will fully convey the scope of the present disclosure to those skilled in the art. Accordingly, the scopes of the present disclosure are not limited to the following exemplary embodiments. Meanwhile, the same reference numerals or the same reference designators denote the same elements throughout the following exemplary embodiments and the drawings.

It will be also understood that although the terms first, second, third etc. may be used herein to describe various elements, these elements should not be limited by these terms. These terms are only used to distinguish one element from another element.

It will be also understood that when an element such as a layer, region or substrate is referred to as being "on" another element, it can be directly on the other element or intervening elements may be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1B:
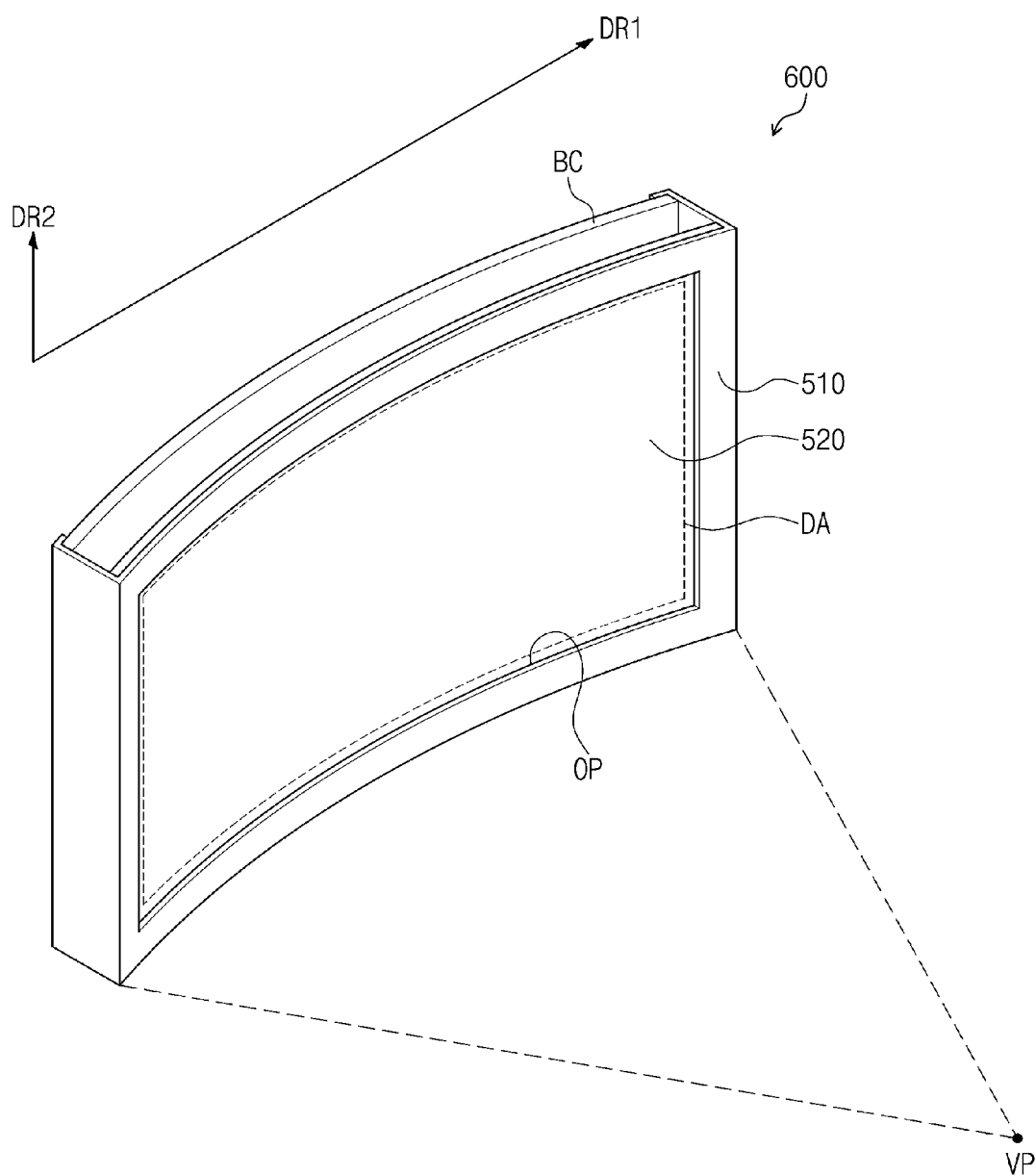
FIG. 1B is a perspective view illustrating the display panel of the display device of FIG. 1A, in a curved state thereof changed from the flat state thereof.

FIG. 1A is a perspective view illustrating an embodiment of a display device including a display panel in a flat state thereof according to the invention, and FIG. 1B is a perspective view illustrating the display panel of the display device of FIG. 1A, in a curved state thereof changed from the flat state thereof.

Referring to FIGS. 1A and 1B, a display device 600 displays an image at and/or through a display surface DA thereof. In the present embodiment, the display surface DA of the display device 600 may be disposed a flat surface or a curved surface, and a curvature of the display surface DA may be adjusted by driving a curve control assembly (refer to CCU of FIG. 2). The display device 600 illustrated in FIG. 1A has the display surface DA which is flat by the driving of the curve control assembly, and the display device 600 illustrated in FIG. 1B has the display surface DA which is curved by the driving of the same curve control assembly.

Thus, when a viewer controls the driving of the same curve control assembly, a viewer may view an image through the flat display surface DA or may view an image through the curved display surface DA which is concave with respect to a viewpoint VP.

In the present embodiment, the display device 600 includes a display panel 520, a backlight assembly (refer to 500 of FIG. 2), a back cover BC and a (front) cover member 510.

The display panel 520 generates an image with light and displays the image through the display surface DA, and the backlight assembly generates and emits the light to the display panel 520. For the display apparatus 600 and/or the display panel 520, the display surface DA may indicate a display area at which an image is generated and displayed. In a top plan view (e.g., view from the viewpoint VP), a planar area of the display apparatus 600 and/or the display panel 520 excluding the planar area of the display surface DA may indicate a non-display (e.g., peripheral) area thereof.

The cover member 510 may cover edges of the display panel 520 and may be coupled to the back cover BC. An opening OP corresponding to the display surface DA of the display panel 520 may be defined in the cover member 510, and thus the display surface DA may be exposed to outside the cover member 510 and the display device 600 through the opening OP.

The back cover BC is coupled to the cover member 510 to cover a back surface of the display panel 520 and a back surface of the backlight assembly. In the present embodiment, the back cover BC has a curved shape both when the display panel 520 has the curved shape (FIG. 1B) and when the display panel 520 has the flat shape (FIG. 1A). In other words, even though the shape of the display panel 520 is changed, the curved shape of the back cover BC is maintained. Hereinafter, the structure of the display device 600 will be described in more detail.

Figure 2:
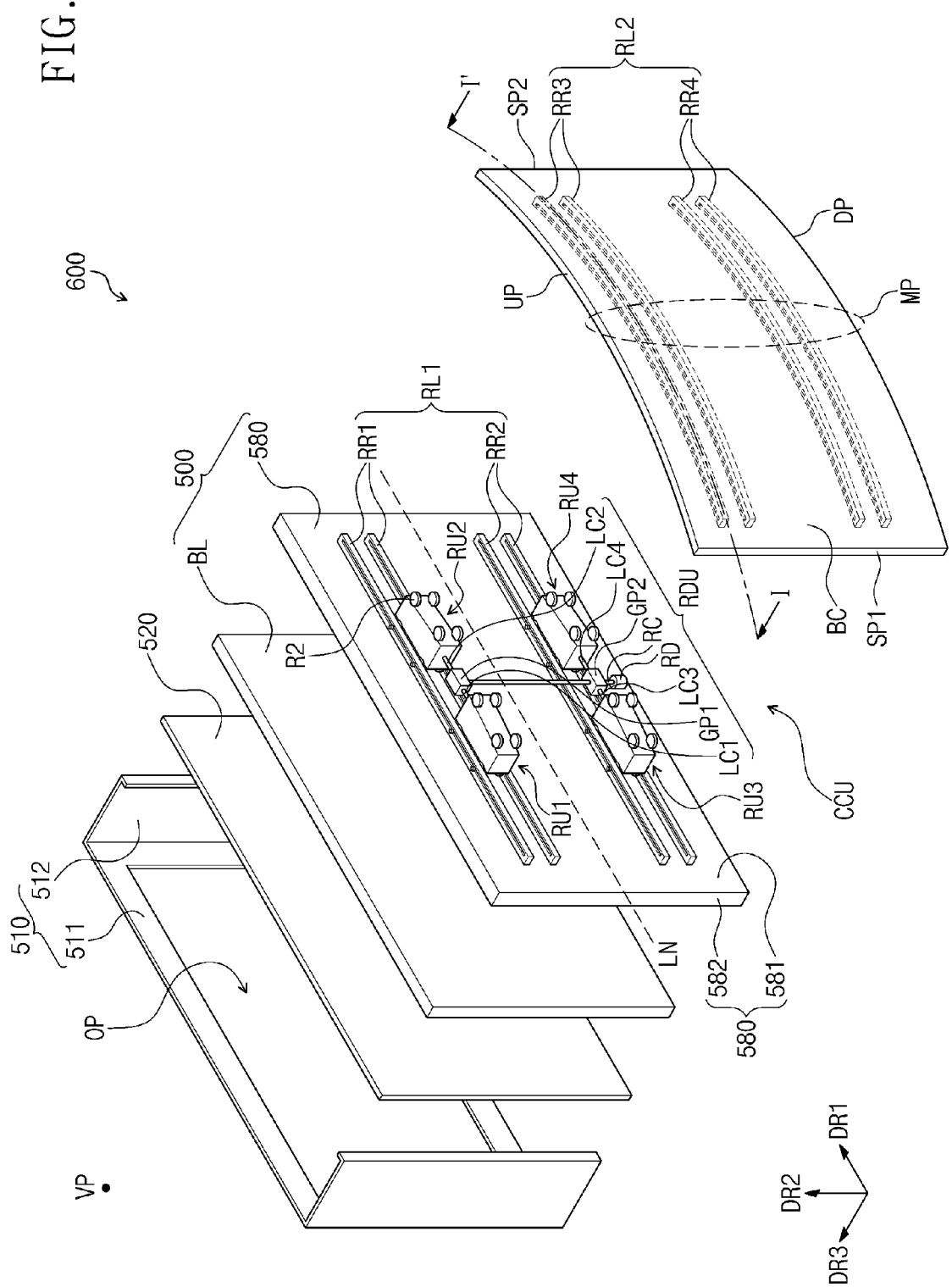
FIG. 2 is an embodiment of an exploded perspective view illustrating the display device in FIG. 1A.
Figure 3A:
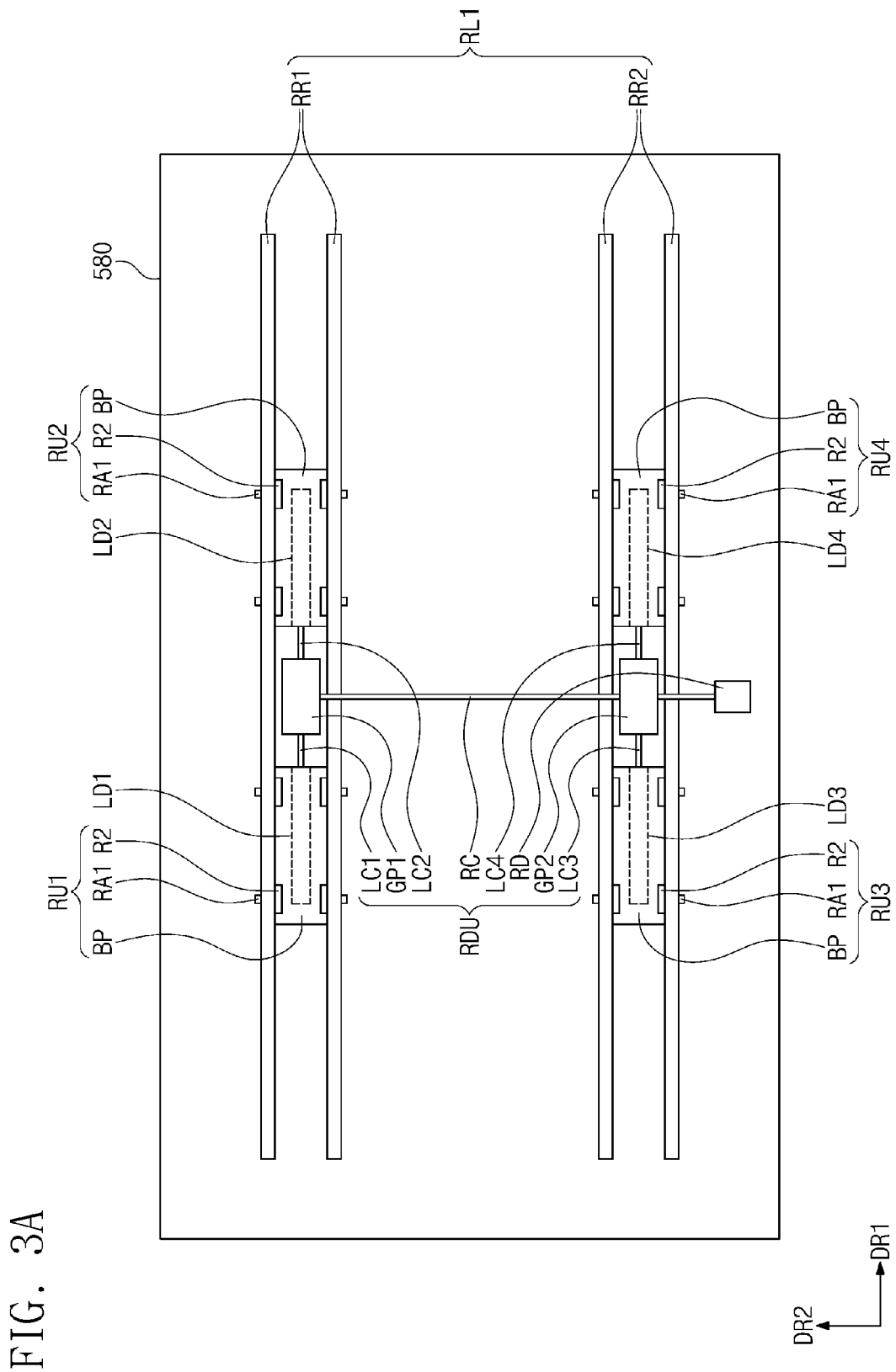
FIG. 3A is a top plan view illustrating an embodiment of a back surface of a backlight assembly of the display device illustrated in FIG. 2.
Figure 3B:
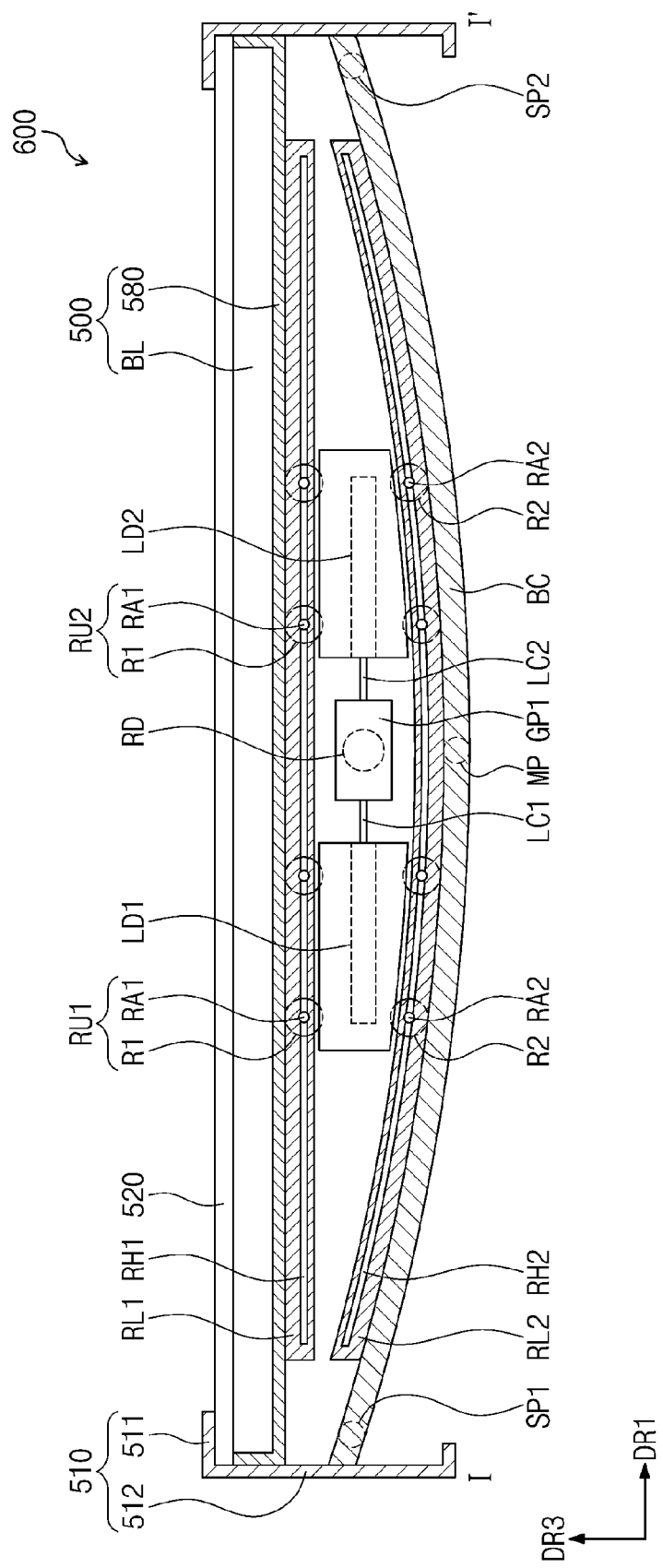
FIG. 3B is a cross-sectional view of the display device taken along line I-I' of FIG. 2.
Figure 3C:
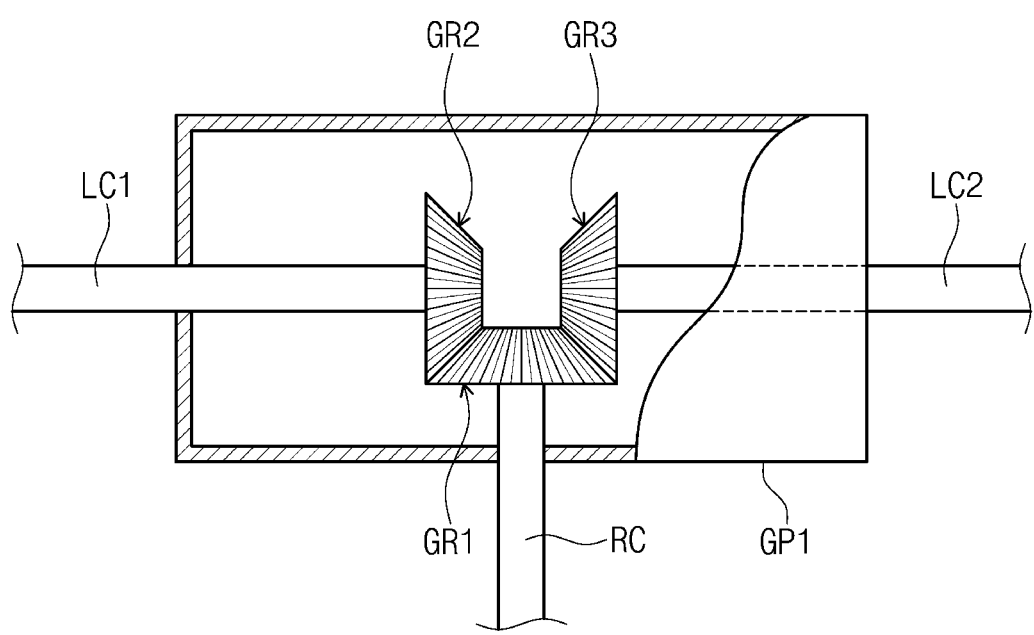
FIG. 3C is an enlarged top plan view illustrating an embodiment of a first gear portion of the display device illustrated in FIG. 3B.

FIG. 2 is an embodiment of an exploded perspective view illustrating the display device 600 in FIG. 1A. FIG. 3A is a top plan view illustrating an embodiment of a back surface of a backlight assembly of the display device illustrated in FIG. 2, FIG. 3B is a cross-sectional view of the display device taken along line I-I' of FIG. 2, and FIG. 3C is an enlarged top plan view illustrating an embodiment of a first gear portion of the display device illustrated in FIG. 3B. FIG. 3B illustrates an assembled state of the components shown in FIG. 2, taken along line I-I' thereof, and the display panel 520 is flat as shown in FIG. 3B.

Referring to FIGS. 2, 3A, 3B and 3C, the display device 600 includes the display panel 520, the backlight assembly 500, the cover member 510, the curve control assembly CCU and the back cover BC.

The display panel 520 generates an image with light and displays the image. In the present embodiment, the display panel 520 may be a liquid crystal display panel. However, embodiments of the present disclosure are not limited to a particular kind of the display panel 520. In other embodiments, for example, the display panel 520 may be a nano-crystal display panel, an electrophoretic display panel, an electrowetting display panel or an electro-luminescence display panel. In certain embodiments, when the display panel 520 is the electro-luminescence display panel self-generating light, the display device 600 may exclude the backlight assembly as an element thereof.

The opening OP is defined in the cover member 510 and the cover member 510 covers a portion of the display panel 520. In the present embodiment, the cover member 510 includes a first cover portion 511 and a second cover portion 512. The first cover portion 511 lengthwise extends along the edges of the display panel 520 to cover a portion of a front surface of the display panel 520. The second cover portion 512 extends from the first cover portion 511 to cover side portions of the display panel 520, the backlight assembly 500 and the curve control assembly CCU. Each of the first and second cover portions 511 and 512 include length portions disposed at different sides of the display apparatus 600 in the top plan view.

The backlight assembly 500 is disposed at a back of the display panel 520. In the present embodiment, the backlight assembly 500 includes a backlight unit BL and a receiving member 580.

The backlight unit BL generates light and provides the generated light to the display panel 520. In the present embodiment, the backlight unit BL may include a light source (not shown), a light guide plate (not shown) guiding the light provided from the light source to the display panel 520, and optical sheets (not shown) controlling a traveling direction of light outputted from the light guide plate. However, embodiments of the present disclosure are not limited to the above-described structure of the backlight unit BL. In other embodiments, for example, the backlight unit BL may include the light source provided in plurality arranged on a bottom portion 581 of the receiving member 580, and optical sheets controlling traveling directions of lights generated from the plurality of light sources.

The receiving member 580 includes the bottom portion 581, and a sidewall 582 provided in plurality extending from the bottom portion 581 to define a receiving space in the receiving member 580. The backlight unit BL is received in the receiving space of the receiving member 580.

The curve control assembly CCU is disposed between the backlight assembly 500 and the back cover BC and is configured to adjust a curved degree of the display panel 520 and the backlight assembly 500.

In the present embodiment, the curve control assembly CCU includes a first rail RL1, a second rail RL2, a first rolling unit RU1, a second rolling unit RU2, a third rolling unit RU3, a fourth rolling unit RU4, a rotation driving unit RDU, a first linear driving unit LD1, a second linear driving unit LD2, a third linear driving unit LD3 and a fourth linear driving unit LD4.

The first rail RL1 is fixed on the back surface of the backlight assembly 500. In more detail, the first rail RL1 is fixed on the bottom portion 581 of the receiving member 580. In the present embodiment, when the display panel 520 has a relatively long side parallel to a first direction DR1, a length of the first rail RL1 may be parallel to the first direction DR1. A relatively short side of the display panel 520 is parallel to a second direction DR2 which crosses the first direction DR1, such as being perpendicular to the first direction DR1 but not being limited thereto.

In the present embodiment, the first rail RL1 includes a first upper rail RR1 and a first lower rail RR2. Each of the first upper rail RR1 and the first lower rail RR2 may include a pair of individual rails arranged in the second direction DR2 spaced apart from each other. When an imaginary line LN is defined to be parallel to the first direction DR1 and to pass through a center of the receiving member 580, the first upper rail RR1 is located above the imaginary line LN so as to be fixed on an upper portion of the receiving member 580 and the first lower rail RR2 is located under the imaginary line LN so as to be fixed on an upper portion of the receiving member 580.

The second rail RL2 is fixed on an inner surface of the back cover BC which faces the back surface of the backlight assembly 500. In the present embodiment, the second rail RL2 includes a second upper rail RR3 and a second lower rail RR4. Each of the second upper rail RR3 and the second lower rail RR4 may include a pair of individual rails arranged in the second direction DR2 spaced apart from each other. The second upper rail RR3 is fixed on an upper portion of the back cover BC to face the first upper rail RR1, and the second lower rail RR4 is fixed on a lower portion of the back cover BC to face the first lower rail RR2.

The back cover BC has a curved shape that is concave with respect to a viewpoint VP. The second rail RL2 fixed on the back cover BC may be curved with a radius of curvature that is substantially equal to a radius of curvature of the back cover BC. In addition, the second rail RL2 may be fixed on the back cover BC by a fixing member such as a bolt and a nut. Thus, in an embodiment, the curved shape of the back cover BC may be maintained by the curved second rail RL2.

The first to fourth rolling units RU1, RU2, RU3 and RU4 are disposed between the back cover BC and the backlight assembly 500. The first to fourth rolling units RU1 to RU4 are linearly movable along the first and second rails RL1 and RL2 such as in the first direction DR1.

In more detail, a top end portion UP, a bottom end portion DP, a first side portion SP1, a second side portion SP2 and a middle portion MP may be defined at the back cover BC. In this case, the first rolling unit RU1 is adjacent to the top end portion UP and is rollable between the middle portion MP and the first side portion SP1. The second rolling unit RU2 is adjacent to the top end portion UP and is rollable between the middle portion MP and the second side portion SP2. In addition, each of the first and second rolling units RU1 and RU2 is linearly movable along the first upper rail RR1 and the second upper rail RR3 which face each other.

The third rolling unit RU3 is adjacent to the bottom end portion DP and is rollable between the middle portion MP and the first side portion SP1, and the fourth rolling unit RU4 is adjacent to the bottom end portion DP and is rollable between the middle portion MP and the second side portion SP2. In addition, each of the third and fourth rolling units RU3 and RU4 is linearly movable along the first lower rail RR2 and the second lower rail RR4 which face each other.

Since a structure of the first to fourth rolling units RU1 to RU4 is substantially the same as each other, a structure of the first rolling unit RU1 among the first to fourth rolling units RU1 to RU4 will be described below as an example. Since a structure of the first and second rails RL1 and RL2, such as a structure of individual rails thereof relative to a rolling unit, is substantially the same as each other, a structure of one individual rail among those of the first and second rails RL1 and RL2 will be described below as an example.

In the present embodiment, the first rolling unit RU1 includes a body (portion) BP, a first roller R1 provided in plurality and a second roller R2 provided in plurality.

The body BP is coupled to the first and second rollers R1 and R2 which are disposed on opposing sides of the body BP in a third direction DR3 which crosses both the first and second direction DR1 and DR2, such as being perpendicular to the first and second direction DR1 and DR2 but not being limited thereto. The first rollers R1 are coupled to one side portion of the body BP to roll along respective individual rails of the first rail RL1. The second rollers R2 are coupled to an opposing side portion of the body BP to roll along respective individual rails of the second rail RL2.

In the present embodiment, a first rail groove RH1 is lengthwise defined in each individual rail of the first rail RL1 in a longitudinal (e.g., length) direction of the first rail RL1, and an axle or shaft of the first roller R1 defines a first rotation axis RA1 of the first roller R1 and is received in the first rail groove RH1. In addition, a second rail groove RH2 is lengthwise defined in each individual rail of the second rail RL2 in a longitudinal direction of the second rail RL2, and an axle or shaft of the second roller R2 defines a second rotation axis RA2 of the second roller R2 and is received in the second rail groove RH2. That is, the first rolling unit RU1 is commonly connected to the first and second rails RL1 and RL2 at the same time.

Thus, when the first rolling unit RU1 moves along the first and second rails RL1 and RL2, departure of the first and second rollers R1 and R2 from the first and second rails RL1 and RL2 is reduced or effectively prevented. In addition, the first rolling unit RU1 may move along multiple individual rails (e.g., two each within the first upper rail RR1 and two each within the second upper rail RR3) the first and second rails RL1 and RL2 to improve the effect of transmitting a force to the receiving member 580 and to the back cover BC through the first and second rails RL1 and RL2.

The rotation driving unit RDU generates a rotational force used to drive the curve control assembly CCU. In the present embodiment, the rotation driving unit RDU includes a motor RD, a main shaft RC, a first auxiliary shaft LC1, a second auxiliary shaft LC2, a third auxiliary shaft LC3, a fourth auxiliary shaft LC4, a first gear portion GP1 and a second gear portion GP2.

The motor RD generates the rotational force by using a power provided from outside thereof. The main shaft RC is coupled to the motor RD and is rotated by the rotational force generated by the motor RD. In the present embodiment, the main shaft RC extends between the first and second rolling units RU1 and RU2 and between the third and fourth rolling units RU3 and RU4, respectively. For example, when the relatively short side of the display panel 520 is parallel to the second direction DR2, the main shaft RC may be parallel to the second direction DR2.

A length extension direction of each of the first to fourth auxiliary shafts LC1 to LC4 intersects a length extension direction of the main shaft RC, and the first to fourth auxiliary shafts LC1 to LC4 are connected to the first to fourth linear driving units LD1 to LD4 in one-to-one correspondence.

The first gear portion GP1 connects the main shaft RC to each of the first and second auxiliary shafts LC1 and LC2. That it, the first gear portion GP1 is commonly connected to each of the main shaft RC and the first and second auxiliary shafts LC1 and LC2. The first gear portion GP1 transmits the rotational force, which is transmitted from the motor RD to the main shaft RC, to each of the first and second auxiliary shafts LC1 and LC2. In this way, rolling units opposing each other may be driven at a same time such as in directions opposite to each other.

In the present embodiment, the first gear portion GP1 may include a first gear GR1, a second gear GR2 and a third gear GR3. The first gear GR1 is coupled to the main shaft RC, the second gear GR2 is coupled to the first auxiliary shaft LC1, and the third gear GR3 is coupled to the second auxiliary shaft LC2.

In the present embodiment, each of the first to third gears GR1, GR2 and GR3 may be a bevel gear having a cone shape. Thus, the rotational force transmitted to the main shaft RC may be transmitted to each of the first and second auxiliary shafts LC1 and LC2 of which lengths thereof intersect that of the main shaft RC.

In the present embodiment, like the first gear portion GP1, the second gear portion GP2 may include a first gear (not shown) coupled to the main shaft RC, a second gear (not shown) coupled to the third auxiliary shaft LC3, and a third gear (not shown) coupled to the fourth auxiliary shaft LC4. Thus, the rotational force transmitted to the main shaft RC may be transmitted to each of the third and fourth auxiliary shafts LC3 and LC4 of which lengths thereof intersect that of the main shaft RC.

The first to fourth linear driving units LD1 to LD4 are coupled to the first to fourth rolling units RU1 to RU4 in one-to-one correspondence. In the present embodiment, the first to fourth linear driving units LD1 to LD4 may be embedded in the first to fourth rolling units RU1 to RU4, respectively, such as in the body BP thereof. The first to fourth linear driving units LD1 to LD4 may be members respectively changing a rotational motion into a linear motion, such as ball screws but not being limited thereto.

In more detail, the first linear driving unit LD1 is coupled to the first auxiliary shaft LC1 to change the rotational force of the rotation driving unit RDU transmitted from the first auxiliary shaft LC1, into a linear motion. Thus, the first rolling unit RU1 coupled to the first linear driving unit LD1 may linearly move along the first and second rails RL1 and RL2.

The second linear driving unit LD2 is coupled to the second auxiliary shaft LC2 to change the rotational force of the rotation driving unit RDU transmitted from the second auxiliary shaft LC2 into a linear motion, and the third linear driving unit LD3 is coupled to the third auxiliary shaft LC3 to change the rotational force of the rotation driving unit RDU transmitted from the third auxiliary shaft LC3 into a linear motion. In addition, the fourth linear driving unit LD4 is coupled to the fourth auxiliary shaft LC4 to change the rotational force of the rotation driving unit RDU transmitted from the fourth auxiliary shaft LC4 into a linear motion.

According to the driving of the first to fourth linear driving units LD1 to LD4 described above, when a rotational direction of the main shaft RC coupled to the motor RD is adjusted or controlled, the first to fourth linear driving units LD1 to LD4 may linearly move back and forth along the first and second rails RL1 and RL2 to respectively linearly move the first to fourth rolling units RU1 to RU4 along individual rails of the first and second rails RL1 and RL2. In this way, rolling units opposing each other (e.g., pair RU1 and RU2 and pair RU3 and RU4) may be driven at a same time such as in directions opposite to each other.

The back cover BC has the curved shape. In the present embodiment, when the back cover BC is defined to have a relatively short side corresponding to each of the first and second side portions SP1 and SP2 and a relatively long side corresponding to each of the top end portion UP and the bottom end portion DP, the relatively short side may have a linear shape parallel to the second direction DR2 and the relatively long side may have a curved shape along the first direction DR1.

In the present embodiment, a composition material of the back cover BC may include a metal material such as aluminum or stainless steel, and thus the back cover BC may have rigidity capable of maintaining the curved shape thereof. Thus, when the first to fourth rolling units RU1 to RU4 move from the middle portion MP closer to the first and second side portions SP1 and SP2 along the first and second rails RL1 and RL2, the curved shape of the back cover BC may be substantially maintained. In contrast, the display panel 520 and the backlight assembly 520 are pushed each away from the back cover BC by the first and second rolling units RU1 to RU4 such that a shape of the display panel 520 and the backlight assembly 520 is changed. This will be described hereinafter in more detail with reference to FIG. 4.

Figure 4:
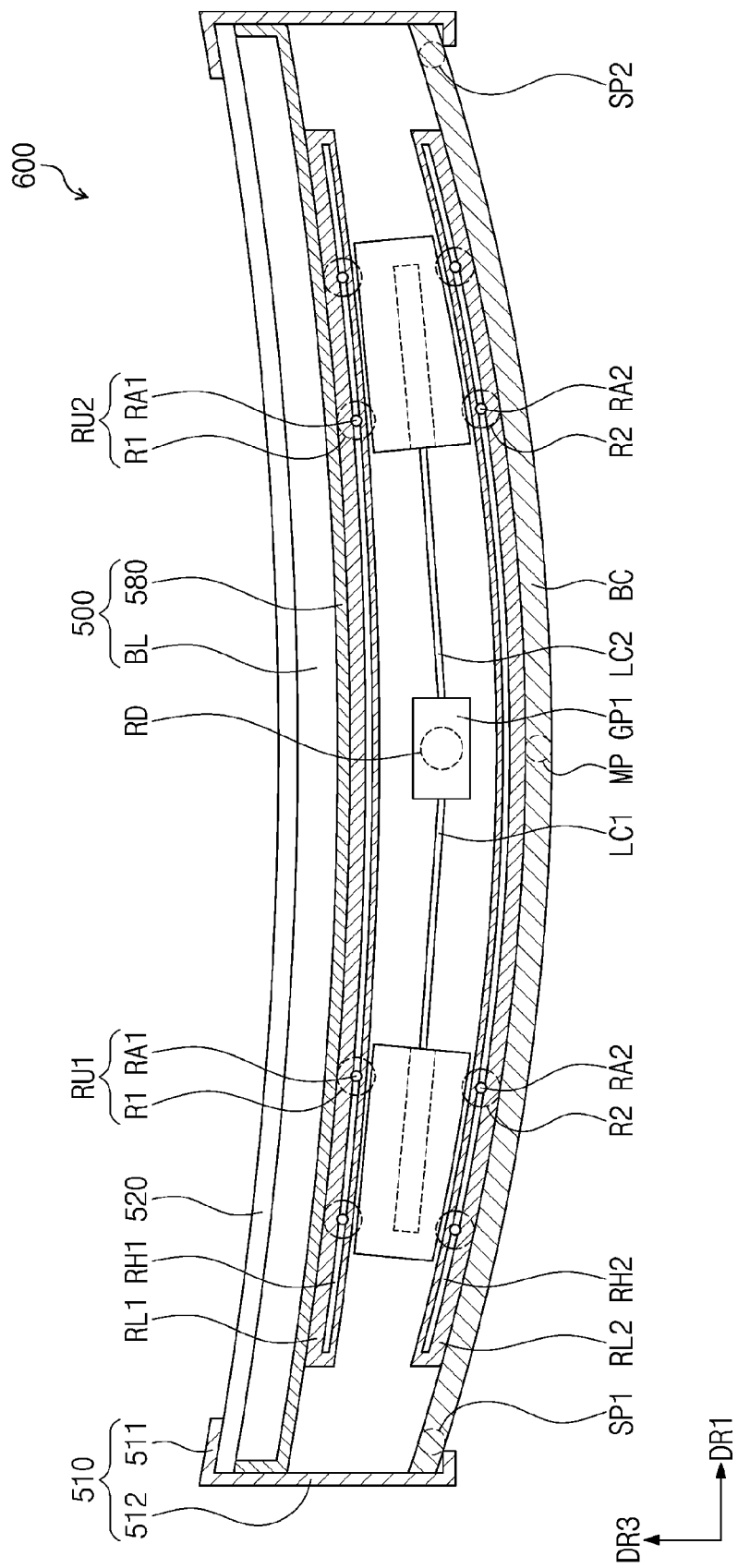
FIG. 4 is a cross-sectional view illustrating adjustment of a radius of curvature of a curvable display panel by operation of an embodiment of a curve control assembly of the display device illustrated in FIG. 2.

FIG. 4 is a cross-sectional view of a display device illustrating adjustment of a radius of curvature of the curvable or bendable display panel 520 by operation of the curve control assembly CCU illustrated in FIG. 2. Since operation of the first to fourth rolling units RU1 to RU4 of FIG. 2 are substantially the same as each other, FIG. 4 illustrates positions and operations of the first and second rolling units RU1 and RU2 among the first to fourth rolling units RU1 to RU4 of FIG. 2. As described above, positions of the first and third rolling units RU1 and RU3 are different from each other and positions of the second and fourth rolling units RU2 and RU4 are different from each other, such as being spaced apart in the second direction DR2. However, the first and third rolling units RU1 and RU3 linearly move together in a same direction as each other along rails, and the second and fourth rolling units RU2 and RU4 linearly move together in a same direction as each other along rails. Thus, the third and fourth rolling units RU3 and RU4 are omitted in FIG. 4, and descriptions to operations of the third and fourth rolling units RU3 and RU4 will be omitted.

Referring to the flat and non-flat positions of the display panel 520 in FIGS. 3B and 4, respectively, the radius of curvature of the display panel 520 may be adjusted using the first and second rolling units RU1 and RU2 moved by driving the rotation driving unit RDU, the first linear driving unit LD1 and the second linear driving unit LD2.

In more detail, referring to positions shown in FIG. 3B, the first rolling unit RU1 is positioned closest to the middle portion MP from among the first side portion SP1 and the middle portion MP of the back cover BC, and the second rolling unit RU2 is positioned closest to the middle portion MP from among the second side portion SP2 and the middle portion MP of the back cover BC. In this case, with the first and second rolling units RU1 and RU2 closest to the middle portion MP, a magnitude of the force of the first and second rolling units RU1 and RU2 pushing the display panel 520 and the backlight assembly 500 in the third direction DR3 may be minimized at a center portion of the curved back cover BC along the first direction DR1, and thus the flat shapes of the display panel 520 and the backlight assembly 500 may be maintained in a static form. In FIG. 3B, a distance between the back cover BC and the display panel 520 is maximum at the middle portion MP (e.g., at the center portion of the curved back cover BC).

Referring to FIG. 4 as compared to positions shown in FIG. 3B, the first rolling unit RU1 is disposed closest to the first side portion SP1 from among the first side portion SP1 and the middle portion MP, and the second rolling unit RU2 is disposed closest to the second side portion SP2 from among the second side portion SP2 and the middle portion MP. In this case, with the first and second rolling units RU1 and RU2 closest to the side portions, the magnitude of the force of the first and second rolling units RU1 and RU2 pushing the display panel 520 and the backlight assembly 500 in the third direction DR3 is maximized. Since a distance between the back cover BC and the display panel 520 is minimum at the side portions, the magnitude of the force is maximized at the side portions.

In addition, even when the first and second rolling units RU1 and RU2 are moved closer to the first and second side portions SP1 and SP2, respectively, the curved shape of the back cover BC may be substantially maintained since the back cover BC has the rigidity maintaining the curved shape thereof. In contrast contrary, since the display panel 520 and the backlight assembly 500 have flexible characteristics as compared with the back cover BC, the display panel 520 and the backlight assembly 500 are pushed in the third direction DR3 by the first and second rolling units RU1 and RU2 as they move closer to the first and second side portions SP1 and SP2, respectively. Thus, shapes of the display panel 520 and the backlight assembly 500 are deformed to be curved to correspond to the curved shape of the back cover BC.

In other words, when the rotational direction of the rotational force of the rotation driving unit RDU is controlled, rotational directions of the first and second auxiliary shafts LC1 and LC2 connected indirectly to the motor RD may be controlled by the first gear portion GP1 and the main shaft RC of FIG. 2 which are connected directly to the motor RD, such that the first and second linear driving units LD1 and LD2 may linearly move the first and second rolling units RU1 and RU2 back and forth along rails based on the rotational directions of the first and second auxiliary shafts LC1 and LC2. Thus, the shape of the display panel 520 may be relatively easily changed from the flat shape (refer to FIG. 3B) into the curved shape (refer to FIG. 4) or from the curved shape into the flat shape by the linear movement of the first and second rolling units RU1 and RU2.

In changing the shape of the display panel 520 into the curved shape (FIG. 4) from the flat shape (FIG. 3B), end portions of the back cover BC are moved along the second cover portion 512 in a direction away from the display panel 520 as compared to a position thereof in FIG. 3B. Even when the end portions of the back cover BC are moved within the cover member 510, the cover member 510 continues to block or blind a space between the display panel 520 and the back cover BC in the third direction DR3.

In the present embodiment, radii of the first and second rollers R1 and R2 of each of the first and second rolling units RU1 and RU2 may be changed according to lengths or radii of curvature of the first and second rails RL1 and RL2. As illustrated in FIG. 4, for example, when the radius of curvature of the display panel 520 is greater than the radius of curvature of the back cover BC, the radius of the first roller R1 may be smaller than the radius of the second roller R2.

Figure 5:
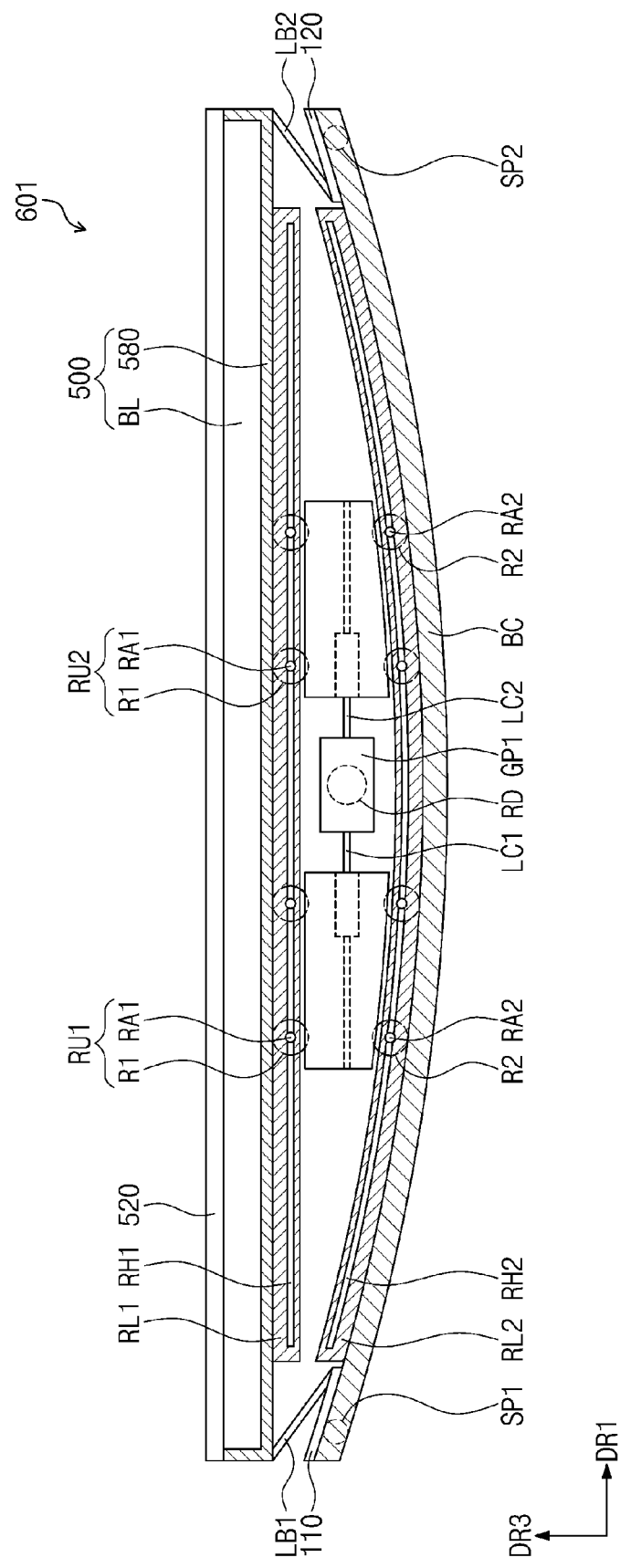
FIG. 5 is a cross-sectional view illustrating another embodiment of a display device including a display panel in a flat state thereof according to the invention.
Figure 6:
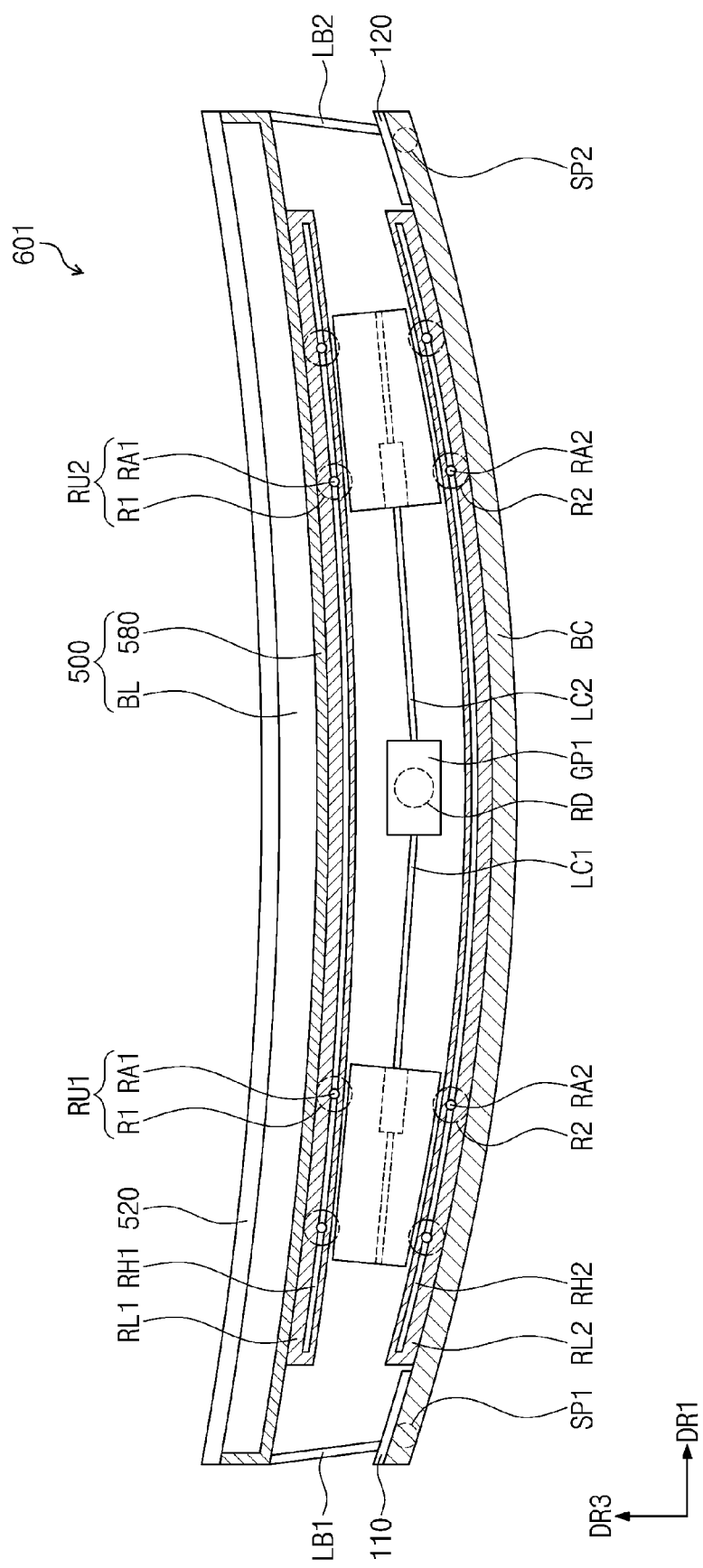
FIG. 6 is a view illustrating the display panel of the display device of FIG. 5, in a curved state thereof changed from the flat state thereof.

FIG. 5 is a cross-sectional view illustrating another embodiment of a display device 601 including a display panel 520 in a flat state thereof according to the invention, and FIG. 6 is a view illustrating the display panel 520 of the display device 601 of FIG. 5 in a curved state thereof changed from the flat state thereof. In the embodiment of FIGS. 5 and 6, the same elements as in the embodiment described above will be indicated by the same reference numerals or the same reference designators, and the descriptions thereto will be omitted or mentioned briefly.

Referring to FIGS. 5 and 6, a display device 601 includes a display panel 520, a backlight assembly 500, a curve control assembly CCU, a back cover BC, a first blinding plate LB1, a second blinding plate LB2, a first guide portion 110 and a second guide portion 120.

When the display device 601 is compared with the display device 600 illustrated in FIG. 3B, the display device 601 further includes the first and second blinding plates LB1 and LB2 and the first and second guide portions 110 and 120 as elements but does not include the cover member 510 of FIG. 3B. In the present embodiment, since the display device 601 does include the cover member, a size of a bezel region of the display device 601 may be reduced. As a result, a viewer may obtain a feeling that a display surface (refer to DA of FIGS. 1A and 1B) of the display device 601 is enlarged.

The first and second guide portions 110 and 120 are disposed on the first and second side portions SP1 and SP2 of the back cover BC, respectively. In more detail, the first guide portion 110 is disposed at the first side portion SP1 of the back cover BC outside the first and second rails RL1 and RL2. The first and second rails RL1 and RL2 may expose a portion of the back cover BC at the first and second side portions SP1 and SP2. In the present embodiment, a (rail) groove (not shown) may be defined in each of the first and second guide portions 110 and 120. Similar to the rail grooves of the first and second rails RL1 and RL2, the grooves in the first and second guide portions 110 and 120 may be lengthwise extended in the first direction DR1.

The first and second blinding plates LB1 and LB2 connect the backlight assembly 500 to the back cover BC in the third direction DR3 so as to block or blind a space defined between the backlight assembly 500 and the back cover BC.

The first blinding plate LB1 connects the receiving member 580 of the backlight assembly 500 to the first side portion SP1 of the back cover BC. In the present embodiment, a first end portion of the first blinding plate LB1 may be hinge-coupled to the receiving member 580, and a second end portion of the first blinding plate LB1 opposite to the first end portion thereof may be received in the rail groove defined in the first guide portion 110. The second end portion of the first blinding plate LB1 may be slidably connected with the rail groove defined in the first guide portion 110.

The second blinding plate LB2 connects the receiving member 580 of the backlight assembly 500 to the second side portion SP2 of the back cover BC. In the present embodiment, a first end portion of the second blinding plate LB2 may be hinge-coupled to the receiving member 580, and a second end portion of the second blinding plate LB2 opposite to the first end portion thereof may be received in the rail groove defined in the second guide portion 120. The second end portion of the second blinding plate LB2 may be slidably connected with the rail groove defined in the second guide portion 120.

In the embodiment illustrated in FIG. 3B, when the shape of the display panel 520 of FIG. 3B is changed from the flat shape into the curved shape, a space between the backlight assembly 500 and the back cover BC of FIG. 3B may be blocked or blinded by the cover member 510 of FIG. 3B. In contrast, in the embodiment of FIGS. 5 and 6, since the cover member is omitted in the display device 601, the space between the backlight assembly 500 and the back cover BC may be blocked or blinded by the first and second blinding plates LB1 and LB2 instead of the cover member.

In more detail, referring to the positions shown in FIG. 5, the first rolling unit RU1 is positioned closest to the middle portion MP from among the first side portion SP1 and the middle portion MP of the back cover BC, and the second rolling unit RU2 is positioned closest to the middle portion MP among the second side portion SP2 and the middle portion MP of the back cover BC. In this case, with the first and second rolling units RU1 and RU2 closest to the middle portion MP, the magnitude of the force of the first and second rolling units RU1 and RU2 pushing the display panel 520 and the backlight assembly 500 in the third direction DR3 is minimized.

Thus, the flat shapes of the display panel 520 and the backlight assembly 500 may be maintained. In this case, the second end portion of the first blinding plate LB1, which is connected to the first guide portion 110, moves closer to the second rail RL2 along the groove in the first guide portion 110. Similarly, the second end portion of the second blinding plate LB2, which is connected to the second guide portion 120, moves closer to the second rail RL2 along the groove in the second guide portion 120.

Referring to FIG. 6 as compared to positions shown in FIG. 5, the first rolling unit RU1 is disposed closest to the first side portion SP1 from among the first side portion SP1 and the middle portion MP, and the second rolling unit RU2 is disposed closest to the second side portion SP2 from among the second side portion SP2 and the middle portion MP. In this case, with the first and second rolling units RU1 and RU2 closest to the side portions, the magnitude of the force of the first and second rolling units RU1 and RU2 pushing the display panel 520 and the backlight assembly 500 in the third direction D3 is maximized.

Since the first display panel 520 and the backlight assembly 500 are pushed in the third direction DR3 by the first and second rolling units RU1 and RU2, the flat shape of each of the display panel 520 and the backlight assembly 500 becomes curved to correspond to the curved shape of the back cover BC.

In addition, the second end portion of the first blinding plate LB1, which is connected to the first guide portion 110, moves away from the second rail RL2 in the first direction DR1 along the groove in the first guide portion 110. Similarly, the second end portion of the second blinding plate LB2, which is connected to the second guide portion 120, moves away from the second rail RL2 in the first direction DR1 along the groove in the second guide portion 120.

As described above, even though the shapes of the display panel 520 and the backlight assembly 500 are changed from the flat shapes into the curved shapes or from the curved shapes into the flat shapes by the driving of the first and second rolling units RU1 and RU2, the space between the backlight assembly 500 and the back cover BC may be blocked or blinded by the first and second blinding plates LB1 and LB2.

According to one or more embodiment of the present disclosure, the shape of the display panel may be relatively easily changed from the flat shape into the curved shape or from the curved shape into the flat shape by using the curve control assembly. In particular, the rolling units of the curve control assembly may move along the rails fixed on the curved back cover and the backlight assembly, and shafts which define the rotation axes of the rollers of the rolling units may be received in the rail grooves defined in the rails. Thus, the force of the rolling units pushing the display panel towards the viewpoint to curve the display panel may be relatively easily transmitted to the display panel, and the force of the rolling units pulling the display panel away from the viewpoint to flatten the display panel may be relatively easily transmitted to the display panel.

According to one or more embodiment of the present disclosure, since the display panel is curved to correspond according to the curved shape of the back cover, the curved shape of the display panel may be relatively easily controlled. In an embodiment, for example, the back cover may be designed to have the curved shape having a certain radius of curvature. In this case, the curvable display panel may be curved to have the certain radius of curvature when the display panel is curved by the curve control assembly.

According to one or more embodiment of the present disclosure, the curved rail is fixed on the back cover. Since the curved rail maintains the curved shape of the back cover, the display device does not need an additional part (e.g., a bracket) maintaining the rigidity of the back cover.

While the present disclosure have been described with reference to example embodiments, it will be apparent to those skilled in the art that various changes and modifications may be made without departing from the spirits and scopes of the present disclosure. Therefore, it should be understood that the above embodiments are not limiting, but illustrative. Thus, the scopes of the present disclosure are to be determined by the broadest permissible interpretation of the following claims and their equivalents, and shall not be restricted or limited by the foregoing description.

What is claimed is:

1. A display device comprising:
a display panel which generates and displays an image with light;
a backlight assembly which is coupled to the display panel and provides the light to the display panel;
a back cover which faces the display panel with the backlight assembly interposed therebetween, the back cover having a curved shape and covers a back surface of the backlight assembly; and
a curve control assembly which is disposed between the backlight assembly and the back cover and adjusts a curved degree of the display panel,
wherein the curve control assembly comprises:
a first rail coupled to the back surface of the backlight assembly;
a second rail coupled to the back cover to face the first rail; and
a rolling unit disposed between the back cover and the backlight assembly and commonly connected to each of the first rail and the second rail, the rolling unit movable along the first rail and the second rail to move the display panel in directions toward and away from the back cover.

2. The display device of claim 1, wherein the second rail is fixed on an inner surface of the back cover to have a curved shape corresponding to the curved shape of the back cover.

3. The display device of claim 2, wherein the backlight assembly comprises:
a backlight unit which generates and emits the light to the display panel; and
a receiving member which receives the backlight unit and includes a back surface as the back surface of the backlight assembly,
wherein the first rail is fixed on the back surface of the receiving member.

4. The display device of claim 1, wherein the rolling unit comprises:
a body;
a first roller which is disposed at a first side portion of the body to be movable along the first rail; and
a second roller which is disposed at a second side portion of the body opposite to the first side portion thereof, the second roller being movable along the second rail.

5. The display device of claim 4, wherein
the first and second rollers each includes a shaft which defines a rotation axis thereof,
a first rail groove is defined lengthwise in a length extension direction of the first rail,
a second rail groove is defined lengthwise in a length extension direction of the second rail in,
the shaft of the first roller which defines the rotation axis of the first roller is received in the first rail groove, and
the shaft of the second roller which defines the rotation axis of the second roller is received in the second rail groove.

6. The display device of claim 3, wherein the curve control assembly further comprises:
a rotation driving unit which generates a rotational force; and
a linear driving unit coupled to the rotation driving unit and the rolling unit,
wherein the linear driving unit linearly moves the rolling unit along the first rail and the second rail by using the rotational force provided from the rotation driving unit.

7. The display device of claim 6, wherein the rotation driving unit comprises:
a motor which generates the rotational force;
a main shaft which is coupled to the motor and receives the rotational force from the motor;
an auxiliary shaft which intersects the main shaft and is coupled to the linear driving unit at the rolling unit; and
a gear portion which is commonly coupled to the main shaft and the auxiliary shaft and transmits the rotational force to the auxiliary shaft from the main shaft.

8. The display device of claim 7, wherein
the first and second rails are each lengthwise extended in a first direction,
the back cover is curved along the first direction and includes a middle portion thereof disposed along the first direction, first and second side end portions opposite to each other along the first direction with respect to the middle portion, and top and bottom end portions opposing each other in a second direction crossing the first direction, and
the rolling unit is provided in plurality and comprises:
a first rolling unit which is adjacent to the top end portion of the back cover and disposed between the middle portion and the first side end portion of the back cover;
a second rolling unit which is adjacent to the top end portion of the back cover and disposed between the middle portion of the back cover and the second side end portion of the back cover;
a third rolling unit which is adjacent to the bottom end portion of the back cover and disposed between the middle portion and the first side end portion of the back cover; and
a fourth rolling unit which is adjacent to the bottom end portion of the back cover and disposed between the middle portion and the second side portion of the back cover.

9. The display device of claim 8, wherein a length of the main shaft extends in the second direction between the first and second rolling units and between the third and fourth rolling units.

10. The display device of claim 8, wherein
the display panel moved in the direction away from the back cover defines a radius of curvature of the display panel, and
the first and third rolling units disposed closer to the first side end portion than to the middle portion of the back cover and the second and fourth rolling units disposed closer to the second side end portion than to the middle portion of the back cover decreases the radius of curvature of the display panel.

11. The display device of claim 8, wherein
the display panel moved in the direction away from the back cover defines a curved shape of the display panel, and
with the second rail having the curved shape corresponding to the curved shape of the back cover, the first and third rolling units disposed closer to the first side end portion than to the middle portion of the back cover and the second and fourth rolling units disposed closer to the second side end portion than to the middle portion of the back cover forms the curved shape of the display panel corresponding to the curved shape of the back cover.

12. The display device of claim 8, wherein
the display panel moved in the direction away from the back cover defines a radius of curvature of the display panel, and
the first and third rolling units disposed closer to the middle portion than to the first side end portion of the back cover and the second and fourth rolling units disposed closer to the middle portion than to the second side portion of the back cover increases the radius of curvature of the display panel.

13. The display device of claim 8, wherein
the display panel moved in the direction toward the back cover defines a flat shape of the display panel, and
with the second rail having the curved shape corresponding to the curved shape of the back cover, the first and third rolling units disposed closer to the middle portion than to the first side portion of the back cover and the second and fourth rolling units disposed closer to the middle portion than to the second side portion of the back cover forms the flat shape of the display panel.

14. The display device of claim 1, wherein
a space is defined between the back cover and the backlight assembly and in which the curve control assembly is disposed,
an end of the second rail which is coupled to the back cover exposes a portion of the back cover at a side portion thereof,
further comprising:
a guide member disposed at the exposed portion of the back cover, and
a blinding plate which connects the guide member at the side portion of the back cover to the backlight assembly and covers the space between the back cover and the backlight assembly, the blinding plate slidably disposed relative to the guide member at the side portion of the cover.

15. The display device of claim 1, wherein
the display panel comprises a display surface at which the image is displayed, and
a space is defined between the back cover and the backlight assembly and in which the curve control assembly is disposed,
further comprising:
a cover member which covers edges of the display panel and includes an opening corresponding to the display surface of the display panel,
wherein the cover member comprises:
a first cover portion extending along the edges of the display panel to cover a front surface of the display panel; and
a second cover portion extending from the first cover portion to cover the space between the back cover and the backlight assembly.

16. A display device comprising:
a display panel which generates and displays an image with light;
a receiving container in which the display panel is received;
a back cover which faces the display panel with the receiving container interposed therebetween, the back cover having a curved shape and covers a back surface of the receiving container; and
a curve control assembly which is disposed between the receiving container and the back cover and adjusts a curved degree of the display panel,
wherein the curve control assembly comprises:
a first rail coupled to the back surface of the receiving container;
a second rail coupled to the back cover to face the first rail; and
a roller unit disposed between the back cover and the receiving container and commonly connected to each of the first rail and the second rail, the roller unit movable along the first rail and the second rail to move the display panel in directions toward and away from the back cover.

17. The display device of claim 16, wherein
the second rail has the curved shape of the back cover and fixed on a front surface of the back cover to maintain the curved shaped of the back cover,
the first and second rails are each lengthwise extended in a first direction,
the back cover is curved along the first direction and includes a middle portion thereof disposed along the first direction, and first and second side end portions opposite to each other along the first direction with respect to the middle portion, and
the roller unit commonly connected to each of the first rail and the second rail is provided in plurality and comprises:
a first roller unit which disposed between the middle portion and the first side end portion of the back cover; and
a second roller unit disposed between the middle portion of the back cover and the second side end portion of the back cover,
wherein the first and second roller units are movable at a same time in opposite directions to each other with respect to the middle portion to move the display panel in the directions toward and away from the back cover.

18. The display device of claim 17, wherein
the display panel moved in the direction away from the back cover defines a curved shape of the display panel, and
with the curved second rail having the curved shape of the back cover, the first roller unit disposed closer to the first side end portion than to the middle portion of the back cover and the second roller unit disposed closer to the second side end portion than to the middle portion of the back cover forms the curved shape of the display panel corresponding to the curved shape of the back cover.

19. The display device of claim 17, wherein
the display panel moved in the direction toward the back cover defines a flat shape of the display panel, and
with the curved second rail having the curved shape of the back cover, the first roller unit disposed closer to the middle portion than to the first side portion of the back cover and the second roller unit disposed closer to the middle portion than to the second side portion of the back cover forms the flat shape of the display panel.

* * * * *